Oct. 4, 1932. W. A. JENKINS 1,880,391
AUTOMATIC NIPPLE THREADING MACHINE
Filed Feb. 13, 1928   6 Sheets-Sheet 1

Inventor
W. A. Jenkins.
by Martin O. Smith
Attorney.

Patented Oct. 4, 1932

1,880,391

UNITED STATES PATENT OFFICE

WILLIAM A. JENKINS, OF WILMINGTON, CALIFORNIA

AUTOMATIC NIPPLE THREADING MACHINE

Application filed February 13, 1928. Serial No. 253,959.

My invention relates to an automatic nipple threading machine and has for its principal object, the provision of a relatively simple and practical machine that may be effective and economically employed for simultaneously cutting threads on both ends of nipples and the operation of which machine be entirey automatic.

Further objects of my invention are, to provide an automatic nipple threading machine that may be operated with comparatively little power and which will very rapidly and accurately accomplish the work of simultaneously threading both ends of nipples; further, to provide in a machine of the character referred to, simple and efficient means for very firmly clamping or gripping the nipples upon their inner surfaces, while the end portions of the nipples are being externally threaded; further, to provide a nipple threading machine that has a wide range of adjustments in order that nipples of different sizes may be threaded; further, to provide a machine of the character described with simple and positively acting means for feeding the nipples into position to be engaged by the gripping members and the threading dies.

A further object of my invention, is to provide in a nipple threading machine, relatively simple means for automatically reversing the rotation of the threading dies so that the same will withdraw from the nipple after the same has been threaded, and further, to provide simple means that acts automatically for retracting the nipple engaging and holding means after the withdrawal of the thread cutting dies.

With the foregoing and other objects in view, my invention consists in certain novel features of construction and arrangement of parts that will be hereinafter more fully described and claimed and illustrated in the accompanying drawings in which:

Referring by numerals to the drawings,—10 designates the frame of the machine and consists of legs 11 supporting a top 12 having rails 13 thereon, upon which blocks 14 and 15 are slidably mounted. The blocks 14 and 15 are of the same construction and serve to carry die heads 16 holding chasers 17. The die heads 16 are removably secured to the inner ends of sleeves 18 mounted in anti-friction bearings 19 carried by housing 20 of the blocks 14 and 15.

The blocks 14 and 15 are adapted to move toward each other during threading of a nipple, and in opposite directions while the dies are being removed from the threaded nipple, this movement is effected by a screw 21 having right hand threads 22 and left hand threads 23, which are threaded into nuts 24 secured to the underside of the blocks 14 and 15, the screw being mounted in bearings 25 and 26 carried by the frame 10.

The machine as disclosed is constructed to cut right hand threads simultaneously on each end of a nipple. In order to cut right hand threads on each end of the nipple it is necessary to rotate the die heads in opposite directions. The die heads are rotated by gears 28 and 29 respectively keyed to the hollow shafts in the blocks 14 and 15 and mesh with gears 30 and 31 slidably keyed to a main drive shaft 32 and a counter shaft 33 respectively rotated in opposite directions by meshing gears 34 and 35 of equal diameter carried by said shafts.

The shafts 32 and 33 are mounted in bearings 36' carried by the frame 10 and terminate within clutches 37 and 38, which are driven by short shafts 40 and 41 mounted in bearings 41' formed in the frame 10.

Transmission of the machine is arranged as follows:—

Figure 9:
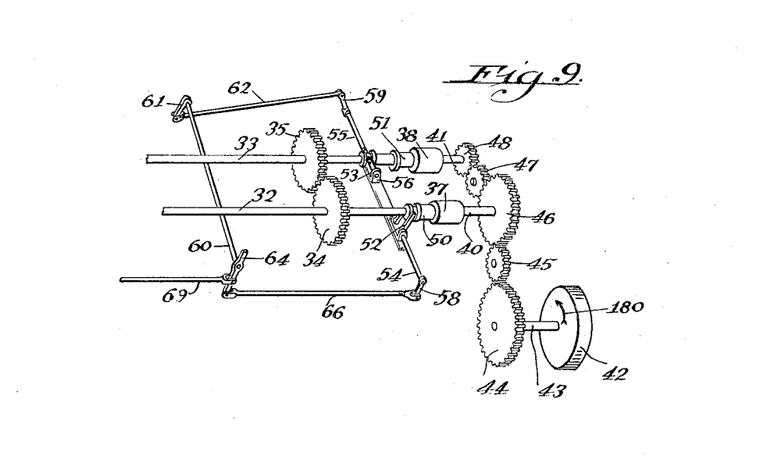
Fig. 9 is a diagrammatic view of the transmission of the machine.
Figure 10:
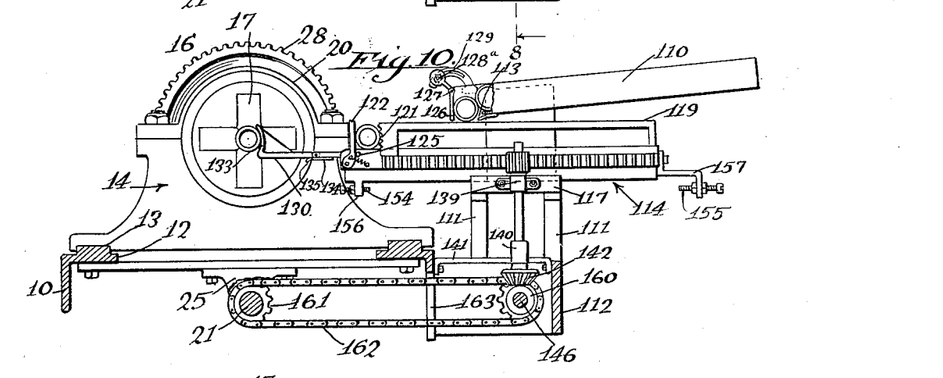
Figs. 10 and 11 are views similar to Fig. 7, showing the nipple feeding mechanism in different positions assumed during the operation of the machine.

Referring to Fig. 9 a drive pulley 42 is secured to a shaft 43 which carries a gear 44 meshing with an idler 45 which meshes with a large gear 46 secured to the outer end of the shaft 40. The gear 46 meshes with an idler 47, which in turn meshes with a small gear 48 secured to the outer end of the shaft 41.

The screw is rotated by a small gear 32ª on an extension 32ᵇ of the main drive shaft 32 which meshes with a large gear 21ª on the same screw 21.

The shafts 32 and 33 carry shifting clutch elements 50 and 51, which are adapted to engage the elements of the clutches 37 and 38, screwed to the shaft 40 and 41 and are actuated by clutch shifters 52 and 53, connected to rock shafts 54 and 55 mounted in suitable bearings 56 and extend outside of the frame 10. It is necessary that the clutches 37 and 38 be alternately engaged to impart proper rotation to the shafts 32 and 33, for instance when the clutch 37 is engaged the clutch 38 is disengaged.

The clutch shifters are actuated by a series of links and levers connected together as follows:—A downwardly extending lever 58 is connected to the rock shaft 54 and an upwardly extending lever 59 is connected to the rock shaft 55. A rock shaft 60 extends lengthwise of the machine, the outer ends of which extend outside of the frame 10 and has a downwardly extending lever 61 connected to it which is also connected by a link 62 to the lever 59.

A lever 64 of a tripping device generally designated at 65 is secured to the outer end of the rock shaft 60 and serves to actuate and hold the shifting elements 50 and 51 of the clutches 37 and 38 alternately in and out of engagement with the elements of the clutches fixed to the shafts 40 and 41. A link 66 is connected to the lower end of the lever 64 and to the lever 58. A tappet 67 is pivotally connected to the frame 10 at 68 and is also connected to the lever 64 by link 69. The lever 64 of the tripping device 65 is normally held in a tilted position by a tube 70 partially filled with mercury set at right angles and mounted on the upper end of the lever 64.

A bracket 72 is secured to the block 15 and carries a threaded push rod 73, which is adjustable by a nut 74 between ears 75 on the bracket. The push rod is provided for actuating the tripping device as follows:—As a nipple is being threaded the blocks 14 and 15 move toward each other. The clutch 50 is engaged and the clutch 51 is disengaged and remain so until the tappet 67 is engaged by the push rod 73, which in turn through the medium of the link 69 will swing the lever 64 of the tripping device from a tilted to a vertical position, as the block 15 continues to move forward the lever will be overbalanced at the moment it is carried past vertical center of the rock shaft 60, due to the mercury in the tube seeking a level, the action of which will quickly tilt the lever 64 and reverse the engagement of the clutches.

A nipple to be threaded is normally held internally against rotation and in alinement with the dies 17 by pins 80 and 81 having tapered ends 82, presenting a plurality of sharp edges 82ª which engage the inner walls of the nipple. The pins 80 and 81 are threaded into the ends of plungers 84 and 85, which extend through the sleeves 18 of the blocks 14 and 15. The plungers 84 and 85 are round and are formed integral with square shafts 86 which extend through square openings 87 formed in the side walls 89 of housings 90 and 91 mounted on opposite ends of the frame 10. The square shafts serve to hold the pins 80 and 81 against rotation. The plungers are urged toward each other by retractible coil springs 92 and 93, the inner ends of which are secured to the side walls of the housings 90, the other ends being secured to brackets 94 mounted on the square shafts 86 and held in place thereon by set screws 94'. The inward movement of the plungers is limited by collars 95 held in place by set screws 96. The brackets 94 have downwardly extending portions 97 having openings therein through which extend rods 98 that are locked to the parts 97 by set screws 98ª. Rods 98 are slidably mounted and held in horizontal alinement in openings 99 in the side walls of the housings 90 and 91.

Tubes 100 are screw threaded into the blocks 14 and 15 and carry brackets 101 having bearings 102 through which spindles 103 extend and upon which are fastened cams 104.

The cams 104 have arms 105 extending upwardly therefrom which are engaged by bumpers 106 adjustably mounted on pins 107 screw threaded into the walls of the housings 90 and 91. The cams 104 are held in position to engage the bumpers 106 by retractile springs 108 connected to the arms 105 and to bars 109 carried by the brackets 101. The cams 104 are provided to retract the pins 80 and 81 in order to release the nipples after they have been threaded and co-act with the push rods 97 through the brackets 98 connected to the shafts 86, hence it will be seen that when the blocks 14 and 15 move apart the plungers 84 and 85 will also move after the cams 104 engage the ends of the rods 98.

An automatic nipple feeding mechanism is provided comprising a trough 110 mounted on the upper end of standards 111 secured to a support 112 secured to the rear end of the frame 10. The trough is slightly inclined and is adapted to hold unthreaded nipples and has an opening 113 at its forward end through which the nipples in the trough drop into a transferring device generally designated at 114. The transferring device consists of a rectangular bar 115 slidably mounted in a groove 116 of a block 117 secured to the standards 111 by screws or bolts 118. An extension 119 is carried by the bar 115 and has an offset 120 having teeth 121 which together with a gate 122 form a breach designated at B, for receiving the nipples from the trough 110.

The gate 122 is normally urged toward the jaw 120 by a retractile spring 123. The gate 122 is pivotally mounted by a pin 124 and its inner movement is limited by a stop pin 125. A door 126 pivotally mounted on a pin 127 extending through the side walls of trough 110 and is adjustably mounted for various size nipples by an arm 128 engaging a curved bracket 129 secured to trough and held in place by a bolt 128a extending through a slot in the bracket.

A nipple ejector generally designated at 130 is pivotally mounted at 131 to a rigid extension 132 secured to the forward end of block 114. The nipple ejector has a curved upwardly projecting arm 133, which is adapted to engage and eject the nipples from the machines after the pins 80 and 81 have been retracted. The ejector is normally held in horizontal alignment with the extension 132 by a leaf spring 134 secured to the extension 132 with its free end 135 engaging the underside of the ejector 130.

The bar 115 has a rack 136 formed on one side engaged by a pinion 137 secured to a shaft 138 extending through a bearing 139 mounted on the block 117, and a bearing 140 mounted on a cross bar 141 secured to the support 112. A bevel gear 142 is secured to the lower end of the shaft 138 and meshes with a bevel gear 143 having hub 144 forming a part of automatic clutch 145. The bevel gear 143 is keyed to a shaft 146, which extends lengthwise of the frame 110 and is mounted in bearings 147 carried by the side walls 148 of the support 112. The hub 144 of the gear 143 has a plurality of grooves 149 which receives tongues 150 formed on a collar 151, which is slidably keyed to the shaft 146. The collar 151 is normally held in engagement with the hub 143 by an expansion coil spring 153, which also holds the bevel pinions in mesh.

The spring is of sufficient tension and the tongue 150 engaging the groove 149 are of sufficient abruptness to cause rotation of the shaft 138. However, when the bar 115 reaches the limit of its movement in either direction the shaft 146 may continue to rotate as the tongue 150 will move out of the grooves 149 against the action of the spring 153, and will continue to engage and disengage although the shaft 138 is held against rotation.

The movement of the block 115 is adjustably limited by screws 154 and 155 extending through mountings 156 and 157, respectively carried at each end of the block 115 by engagement with the faces of the block 117.

Rotation of the shaft 146 is provided by a sprocket 160 on the shaft 146 and a sprocket 161 on the feed screw over which a chain 162 extends, there being an opening 163 formed in the frame 10 to allow passage of the chain from the sprocket 161 to the sprocket 160. The dies may be lubricated by an oiling system consisting of a pump 164 operated by an eccentric 165 carried by the screw 21. A pipe line 166 extends from the pump to a T-fitting 167 from which are carried flexible hose or pipes 168 to pipes 169 screwed into the housings of the blocks 14 and 15, there being outlet pipes 170 extending from the T's 171 carried by pipes 169, which discharge oil onto the dies for lubrication while the nipple is being threaded. The pump is mounted in a pump tank 172 carried by a drain trough 173 secured to the frame 10.

Figure 1:
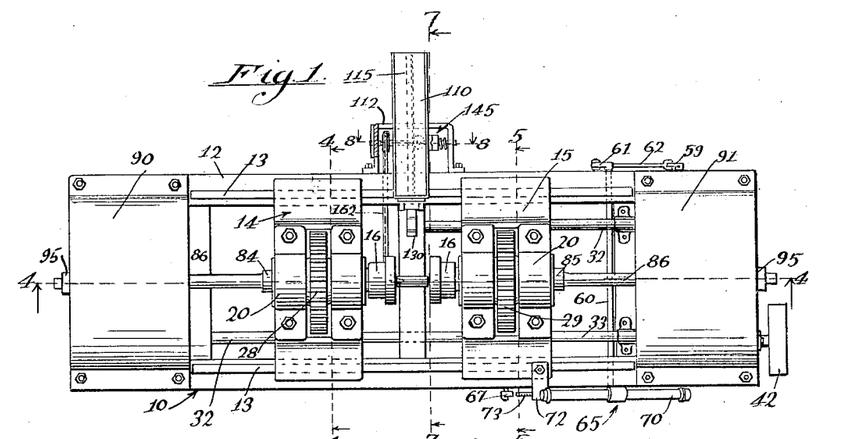
Fig. 1 is a top plan view of the nipple threading machine.
Figure 2:
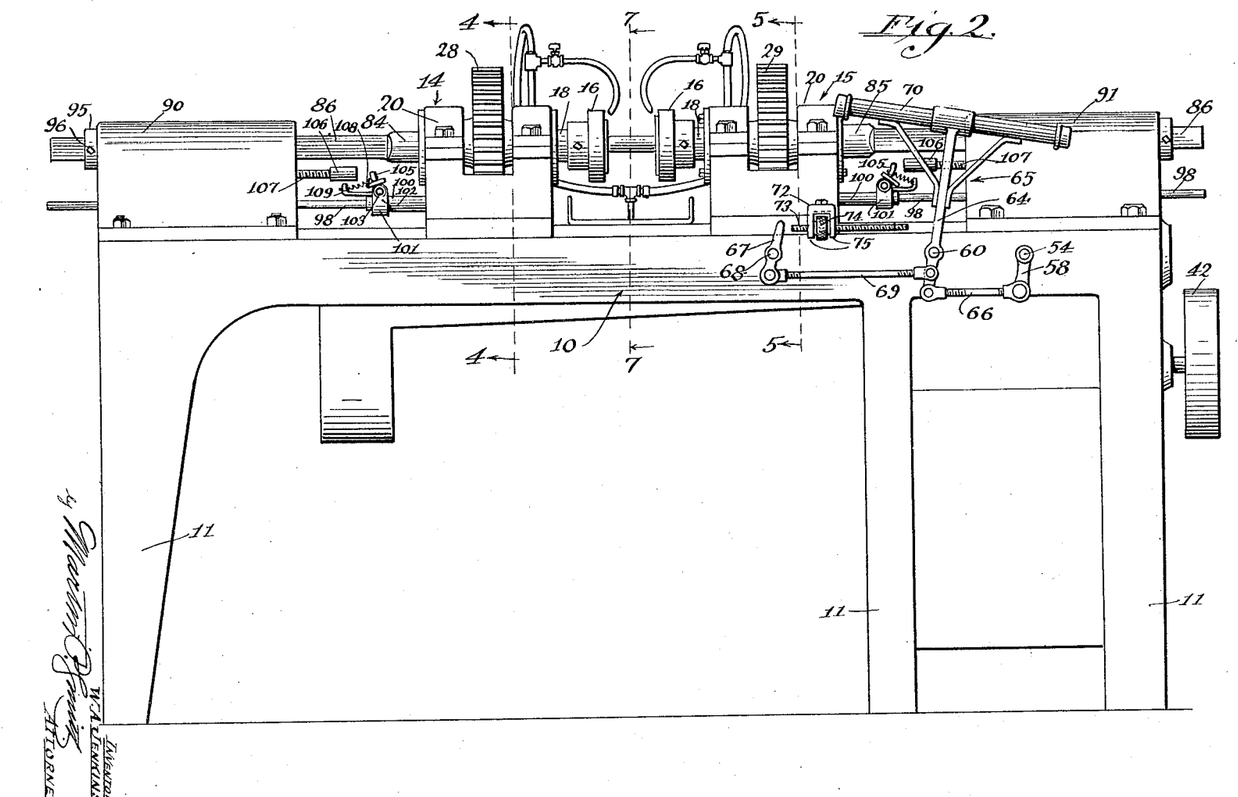
Fig. 2 is a front elevation of the machine.
Figure 3:
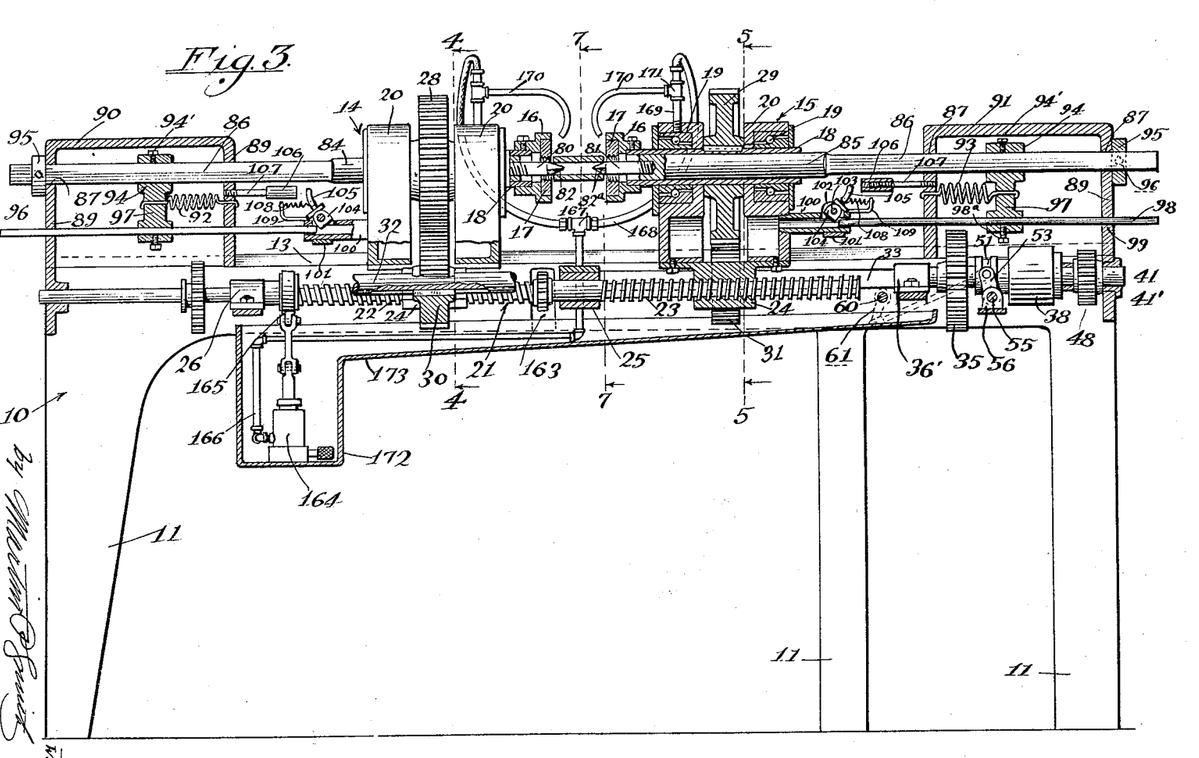
Fig. 3 is a sectional elevation taken on line 3—3, of Fig. 1 in the direction indicated by the arrows.
Figure 4:
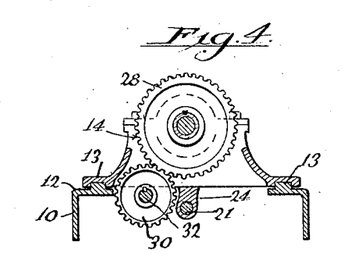
Fig. 4 is a transverse fragmentary sectional view taken on line 4—4 of Figs. 1, 2 and 3, looking in the direction indicated by the arrows.
Figure 5:
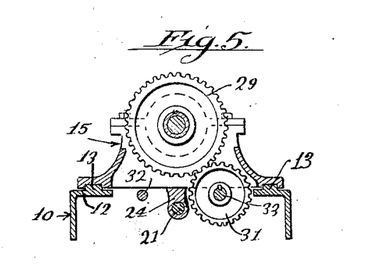
Fig. 5 is a view analagous to Fig. 4 taken on line 5—5, of Figs. 1, 2 and 3.
Figure 6:
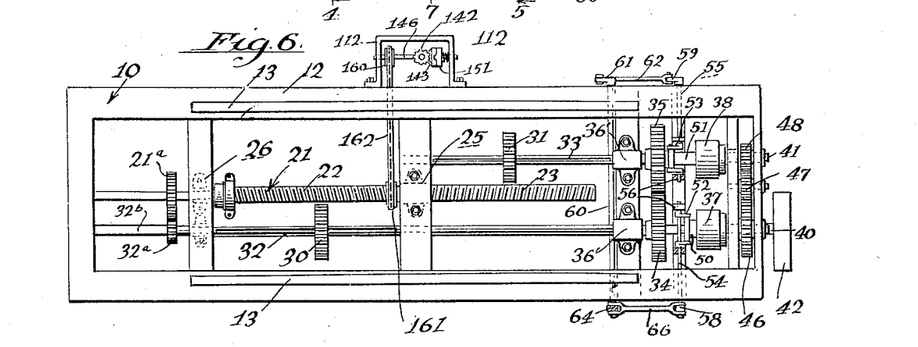
Fig. 6 is a top plan view with parts removed to show other parts not visible in Fig. 1.

The operation of the nipple threading machine is as follows: The pulley 42 is rotated in the direction indicated by the arrow 180, which through the idlers 45 and 47 will cause the gears 46 and 48 to rotate in the same direction when the clutch 50 is engaged and the clutch 51 is disengaged as shown in Figs. 1, 2 and 3. Hence power is transmitted directly to the main drive shaft 32 carrying the gear 34 which in turn causes the gear 35 and shaft 33 to rotate in the opposite direction.

Figure 12:
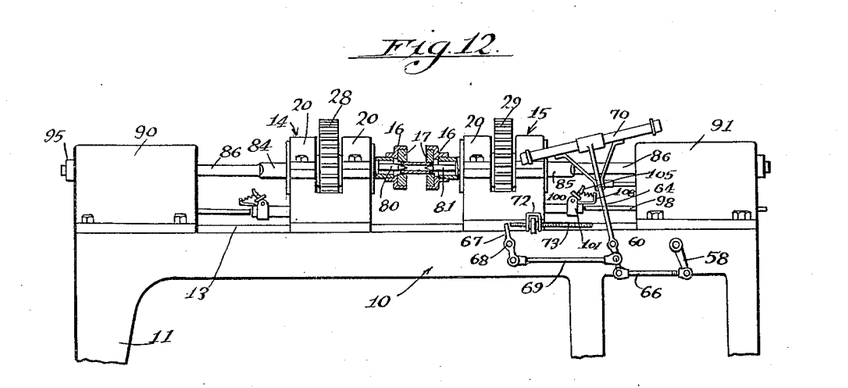
Figs. 12, 13 and 14 are front elevations of the machine on a reduced scale, showing the cycle of operation of the automatic nipple threading machine.

Rotation of the gears 34 and 35 meshing with the gears 30 and 31 will cause the stocks 16 and dies 17 in the blocks 14 and 15 to rotate in opposite directions, respectively through the gears 28 and 29. The blocks are simultaneously moved together by the screw 21 which is rotated by the gears 21a meshing with the gear 32b. As shown in Figs. 1, 2 and 3, a nipple is in a position to be threaded. As the blocks 14 and 15 move together the push rod 73 will engage the tappet 67 and at the interval when the nipple has been threaded the trip device 65 will be tilted into the position shown in Fig. 12, the movement of which will reverse the clutches, that is the clutch will be engaged and clutch 50 disengaged, the action of which will cause a reversal of the rotation of the shafts 32 and 33 and the screw 21 which will move the blocks 14 and 15 apart and at the same time cause the stocks and dies to unscrew from the threads previously formed. The dies 17 are quickly removed from the threaded nipple due to the shafts 32 and 33 having rotated at a higher speed when the clutch 38 is engaged.

Figure 7:
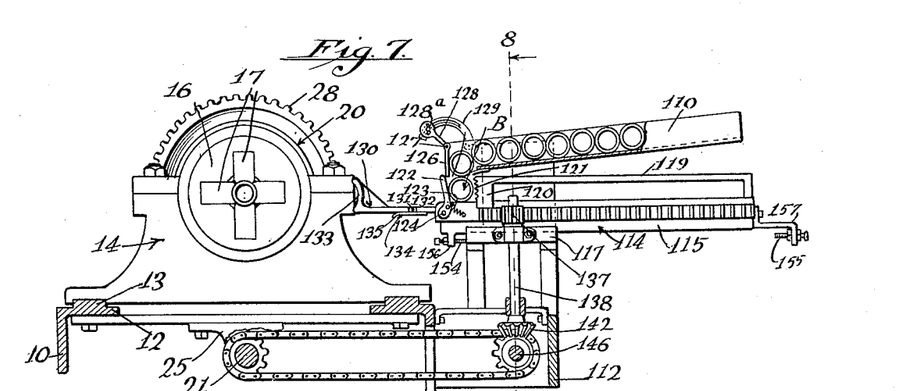
Fig. 7 is a transverse sectional view taken on line 7—7, of Figs. 1, 2 and 3, looking in the direction indicated by the arrows.

When the nipple is being threaded, as previously described, the block 115 of the nipple feeding mechanism will be in the position shown in Fig. 7, and will have received a nipple in the breach B.

Figure 8:
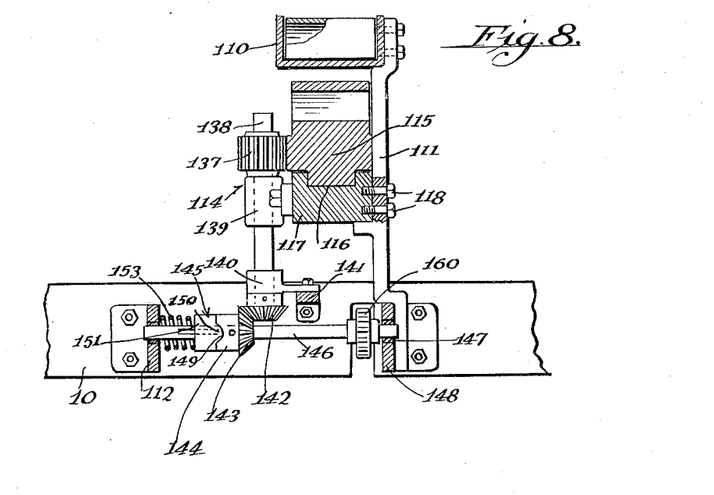
Fig. 8 is a fragmentary sectional view showing the nipple feeding mechanism, taken on line 8—8, of Figs. 1 and 7.
Figure 11:
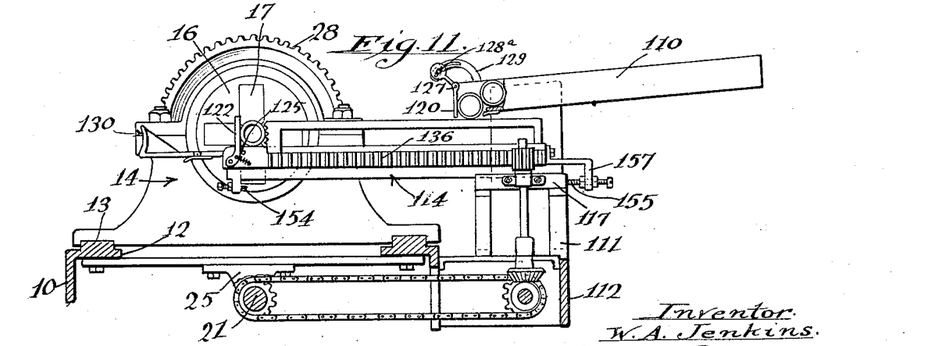
Figure 13:
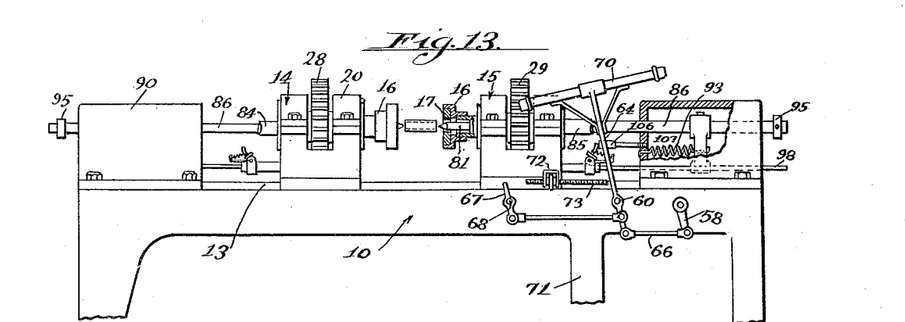

When the nipple is being unthreaded it will bring another nipple in the place shown in Figs. 11 and 13. While the dies 17 are being unscrewed from a threaded nipple, the ejector 130 will engage the nipple as shown in Fig. 8, and exert pressure on it until the pins 80 and 81 have been retracted or moved apart as shown in Fig. 13 at which time the threaded nipple will be removed and another brought into place as shown in Fig. 11.

Figure 14:
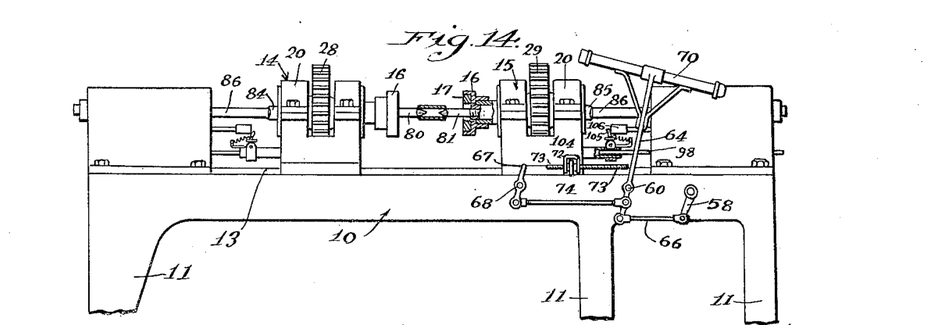

The blocks 14 and 15 continue to move apart until they reach the position shown in Fig. 14 during which time the arms 105 will have engaged the bumpers 106 and tilted the cam 104, which will allow the rod 109 to slide under it, thereby allowing the pins 80 and 81 to grip the nipple which has been delivered by the feeding mechanism. See Figs. 11 and 14.

During the interval when the nipple is being threaded rotation of screw 21 will cause the shaft 138 through the chain 162 and sprockets 160 and 161 to move the block from the position shown in the Fig. 11 to the position shown in Fig. 7. As the block is moved back the gate 122 will be tilted by engagement with the nipple, which has been gripped by the pins and pass under it, this movement being permitted by its pivotal mounting and will be restored to normal position as soon as it passes under the nipple by the action of the spring 123. The ejector will also pass under the nipple in a like manner and be restored to normal position by the spring 134. The above operations are continually repeated and no attention is required on the part of the operator, except to keep the trough filled with nipples.

It will be understood that minor changes in the size, form and construction of the various parts of my improved automatic nipple threading machine may be made and substituted for those herein shown and described without departing from the spirit of the invention, the scope of which is set forth in the appended claims.

I claim, as my invention:—

1. In a nipple threading machine, a pair of nonrotating aligned coaxial plungers mounted for sliding movement toward and away from each other, pins removably seated in the inner ends of said plungers, the outer ends of which pins are diamond shaped and provided with sharp inclined edges that are adapted to engage the inner edges within the ends of an interposed nipple, sleeves loosely mounted on the inner portions of said coaxial plungers, thread cutting dies removably mounted on the inner ends of said sleeves, gear wheels carried by said sleeves, a shaft, pinions carried by said shaft and engaging said gear wheels, means including a pair of clutches for reversing the rotary motion of said shaft, bearings in whch the sleeves are journaled, a shaft having right and left hand screw threads that respectively engage said bearings, means for rotating said shaft first in one direction and then in the other direction and automatically acting means cooperating with the last mentioned shaft rotating means for simultaneously moving the non-rotating plungers toward and away from each other and in proper time relation to the reverse rotary movements imparted to the die carrying sleeves.

2. In a nipple threading machine, a pair of nonrotating aligned coaxial plungers mounted for sliding movement toward and away from each other, pins removably seated in the inner ends of said plungers, the outer ends of which pins are diamond shaped and provided with sharp inclined edges that are adapted to engage the inner edges within the ends of an interposed nipple, sleeves loosely mounted on the inner portions of said coaxial plungers, thread cutting dies removably mounted on the inner ends of said sleeves, gear wheels carried by said sleeves, a shaft, pinions carried by said shaft and engaging said gear wheels, means including a pair of clutches for reversing the rotary motion of said shaft, bearings in which the sleeves are journaled, a shaft having right and left hand screw threads that respectively engage said bearings, means for rotating said shaft first in one direction and then in the other direction, means for automatically causing said co-axial plungers to move simultaneously with the die-carrying sleeves during a part of their longitudinal travel and means for automatically rendering the operation of said last mentioned means inoperative at a predetermined point in its travel.

3. In a nipple threading machine, a frame, a pair of fixed bearings on the outer ends thereof, a pair of bearing blocks arranged for sliding movement toward and away from each other on the intermediate portion of said frame between said bearings, a shaft having right and left hand threaded portions that respectively engage said sliding bearing blocks, means for rotating said shaft first in one direction and then in the other direction, sleeves journaled for rotation in said bearing blocks, thread cutting dies removably carried by the inner ends of said sleeves, means for simultaneously rotating said sleeves first in one direction and then in the other direction, nonrotating plungers arranged for sliding movement through the bearings on the ends of the frame through said sleeves and nipple engaging pins projecting from the inner ends of said nonrotating members, springs for yieldingly resisting the movement of said nonrotating members away from each other and automatically acting means for connecting said non-rotating plungers to said sliding blocks during a portion of their travel away from each other.

4. In a nipple threading machine, a frame, a pair of fixed bearings on the outer ends thereof, a pair of blocks arranged for sliding movement toward and away from each other on the intermediate portion of said frame between said bearings, a shaft having right and left hand threaded portions that respectively engage said sliding blocks, means for rotating said shaft first in one direction and then in the other direction, sleeves journaled for rotaton in said blocks, thread cutting dies removably carried by the inner ends of said sleeves, means for simultaneously rotating said sleeves first in one direction and then in the other direction, nonrotating members arranged for sliding movement through the bearings on the ends of the frame, and through said sleeves, nipple engaging pins projecting from the inner ends of said nonrotating members, means for automatically connecting the nonrotating members to the sliding blocks so that said blocks and nonrotating members will move synchronously with each other during a part of their travel and means for automatically releasing said connecting means.

5. In a nipple threading machine, a frame, a pair of fixed bearings on the outer ends thereof, a pair of blocks arranged for sliding movement toward and away from each other on the intermediate portion of said frame between said bearings, a shaft having right and left hand threaded portions that respectively engage said sliding blocks, means for rotating said shaft first in one direction and then in the other direction, sleeves journaled for rotation in said blocks, thread cutting dies removably carried by the inner ends of said sleeves, means for simultaneously rotating said sleeves first in one direction and then in the other direction, nonrotating plungers arranged for sliding movement through the bearings on the ends of the frame and through said sleeves, springs connected to said plungers for normally drawing the same toward each other, adjustable means for limiting the movement of said plungers toward each other, and nipple engaging pins projecting from the inner ends of said nonrotating plungers, the outer ends of which pins are provided with diamond shaped points having sharp inclined edges for engaging the inner edges of the ends of an interposed nipple, means for automatically connecting the nonrotating plungers to the sliding blocks so that said blocks and nonrotating members will move synchronously with each other during a part of their travel, and means for automatically releasing said connecting means.

6. In a nipple threading machine, a frame, a pair of bearings on the ends thereof, a pair of blocks arranged for sliding movement on the frame between said bearings, a shaft having right and left hand threaded portions engaging said blocks for simultaneously moving the same toward and away from each other, sleeves journaled in said blocks, means for simultaneously rotating said sleeves, thread cutting dies removably arranged on the inner ends of said sleeves, non-rotating plungers arranged for sliding movement through said sleeves and through the bearings on the outer ends of the frame, nipple engaging pins projecting from the inner ends of said plungers the outer ends of said pins being provided with diamond shaped points having sharp inclined edges adapted to engage the inner edges of the ends of an interposed nipple, rods connected to said plungers and arranged for sliding movement in the bearings below the plungers, clutches mounted on the blocks for automatically engaging said sliding rods and holding the same against movement in one direction, brackets connecting said plungers and sliding rods and springs connected to said brackets for yieldingly resisting the sliding movement of the plungers and rods away from each other.

7. In a nipple threading machine, a frame, a pair of bearings on the ends thereof, a pair of blocks arranged for sliding movement on the frame between said bearings, a shaft having right and left hand threaded portions engaging said blocks for simultaneously moving the same toward and away from each other, sleeves journaled in said blocks, means for simultaneously rotating said sleeves, thread cutting dies removably arranged on the inner ends of said sleeves, non-rotating plungers arranged for sliding movement through said sleeves and through the bearings on the outer ends of the frame, nipple engaging pins projecting from the inner ends of said plungers, rods arranged for sliding movement in the bearings below the plungers, clutches mounted on the blocks for engaging said sliding rods and holding the same against sliding movement in one direction, brackets connecting said plungers and sliding rods, springs connected to said brackets for yieldingly resisting the sliding movement of the plungers and rods away from each other, stops adjustably mounted on the outer ends of the plungers for engaging the bearings on the ends of the frame to limit the inward movement of said plungers and adjustable means mounted on the outer portions of said non-rotating plungers for positively limiting their movement toward each other.

In testimony whereof I affix my signature.

WILLIAM A. JENKINS.